United States Patent [19]
Luebkemann et al.

[11] 3,943,802
[45] Mar. 16, 1976

[54] MULTIPLE TOOL TURRET

[75] Inventors: Harry Paul E. Luebkemann; David Bradford Wood, III, both of Cincinnati, Ohio

[73] Assignee: Cincinnati Milacron Inc., Cincinnati, Ohio

[22] Filed: Jan. 9, 1975

[21] Appl. No.: 539,623

[52] U.S. Cl................ 82/2 R; 29/27 R; 82/36 A
[51] Int. Cl.²... B23B 3/00; B23B 29/00; B23B 7/00
[58] Field of Search .......... 82/2 R, 36 A; 29/27, 36, 29/38 B, 39

[56] References Cited
UNITED STATES PATENTS

| | | | |
|---|---|---|---|
| 2,505,685 | 4/1950 | McClernon | 82/36 A X |
| 2,534,333 | 12/1950 | Wyrick | 82/36 A X |
| 2,657,453 | 11/1953 | Brodhun | 29/39 |
| 3,486,209 | 12/1969 | Schultz et al. | 29/27 |
| 3,550,489 | 12/1970 | Kuhn et al. | 82/36 A |
| 3,643,307 | 2/1972 | Ledergerber et al. | 29/38 B |
| 3,750,245 | 8/1973 | Kennedy | 29/39 |
| 3,846,880 | 11/1974 | Foll et al. | 29/36 |

OTHER PUBLICATIONS

Pratt & Whitney — The Star-turn, 12-30, N/C Chucker from American Machinist Magazine, Feb. 19, 1973, p. 44.

*Primary Examiner*—Harrison L. Hinson
*Attorney, Agent, or Firm*—Thomas M. Farrell

[57] ABSTRACT

A turning machine with a rotary work spindle and a slide having a lower carriage movable in parallelism with the axis of the spindle, an upper carriage movable on the lower carriage at right angles to the spindle axis, and a tool support on the upper carriage. The tool support is comprised of two indexable turrets, each having a plurality of tools therein, and a common indexing means so that the turrets are indexed simultaneously.

3 Claims, 4 Drawing Figures

MULTIPLE TOOL TURRET

BACKGROUND OF THE INVENTION

The present invention relates to improvements in tool packing and management thereof in turning machines. Automatic turning machines utilize multiple tools which must be selectively positioned in the working zone by automatic means. To achieve versatility in storing and applying tools, many state-of-the-art machines use indexable turrets for both outside diameter turning and inside diameter turning (commonly referred to as "boring"), and the turrets are individually positioned on their respective way systems and slides. Further, the individual turrets each have an indexing drive to present new tools to the way vector paths.

The outside diameter turning turrets generally comprise indexable drums with the cutting tools extending outward from the drum center, along radial paths. Similarly, prior art boring turrets have boring bars extending radially outward from the indexing center, looking like spokes radiating from a wheel hub. The arrangement of these types of turrets requires multiple way systems to avoid the intrusion of the two tool turrets with the work and with each other when indexing for successive cuts.

It is, therefore, an object of the present invention to provide a tool arrangement which will provide an inexpensive automatic tool changing system for turning machines.

Another object of the invention is to provide a tool arrangement which is capable of high density tool packing when used on machines for outside and inside turning operations.

A further object of the invention is to provide a high density tool arrangement which permits use of outside and inside turning tool turrets and prevents interference of one with the other.

SUMMARY OF THE INVENTION

The invention contained herein lies in a machine tool having a frame supporting a rotary work spindle wherein a single set of ways is provided for movement of a lower carriage in a Z-axis; that is, parallel to the work axis. A second, upper, carriage is movable on a single set of ways on the lower carriage so that the upper carriage may be moved at a substantially right angle to the spindle axis. A tool support is mounted on the upper carriage comprising two indexable turrets. The turret nearest the work spindle face carries a plurality of internal turning bars extending from a circular pattern about the indexing center, and arrayed so the axes of all bars are parallel to the work spindle axis.

The turret farthest from the work spindle face is conical, base extending downward, and carries a like plurality of outside turning tools arrayed baseward along the conical surface of the turret and, further, the conical turret has a cone surface and respective tool mounted substantially at right angles.

PRIOR ART

Figure 1:
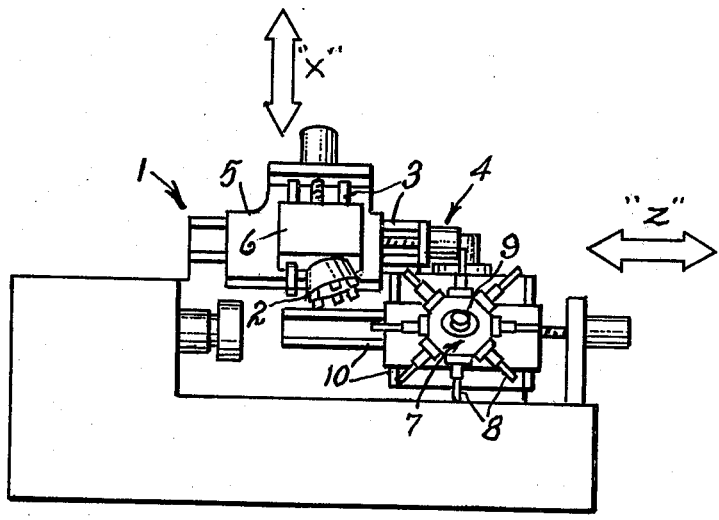
FIG. 1 is a front elevation view of a prior art turning machine showing the internal and external turning tool turrets and their respective individual way systems.

Referring to FIG. 1, we can see a representative prior art type of machine 1 which shows an external turning tool turret 2 mounted on its individual way systems 3, and drive systems 4, that is, having its own lower carriage 5 slidable in the Z-axis (parallel to the work spindle axis), and an upper carriage 6 for movement in the X-axis, (normal to the work spindle axis).

The usual type of internal turning tool turret 7 is shown having all tools 8 arrayed as spokes emanating from the central indexing axis 9 and separate way systems 10 are shown for movement in the Z-axis and X-axis.

It is seen, therefore, that the prior art device such as shown in FIG. 1, requires duplication of axis feed prime movers to move the carriages in their respective vectors, and separate indexing prime movers are required to index the turrets. Further, the machine takes on an overall larger profile because of the clearance movement that is needed to prevent intrusion of tools when being indexed.

Other prior art devices include the turning machine disclosed in U.S. Pat. No. 3,486,209, which shows a prior art machine using one set of ways for each of the X and Z-axes, but does not present the tools to the workpiece in the manner of the present invention needed for efficient tool handling during a machining cycle. Further, a series of multiple tool turret configurations are disclosed in U.S. Pat. No. 3,786,539, but none of the series presents a configuration for handling outside diameter turning tools and boring tools which will give the relatively high density tool packing arrangement of the present invention, for a given machine envelope.

DESCRIPTION OF THE PREFERRED EMBODIMENT

Figure 2:
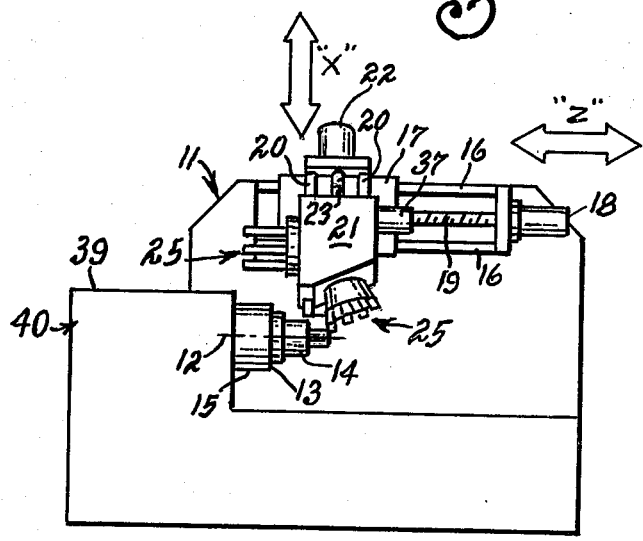
FIG. 2 is a front elevational view of a turning machine showing the multiple tool turrets of the within invention and their respective way systems in relation to a work spindle axis.
Figure 3:
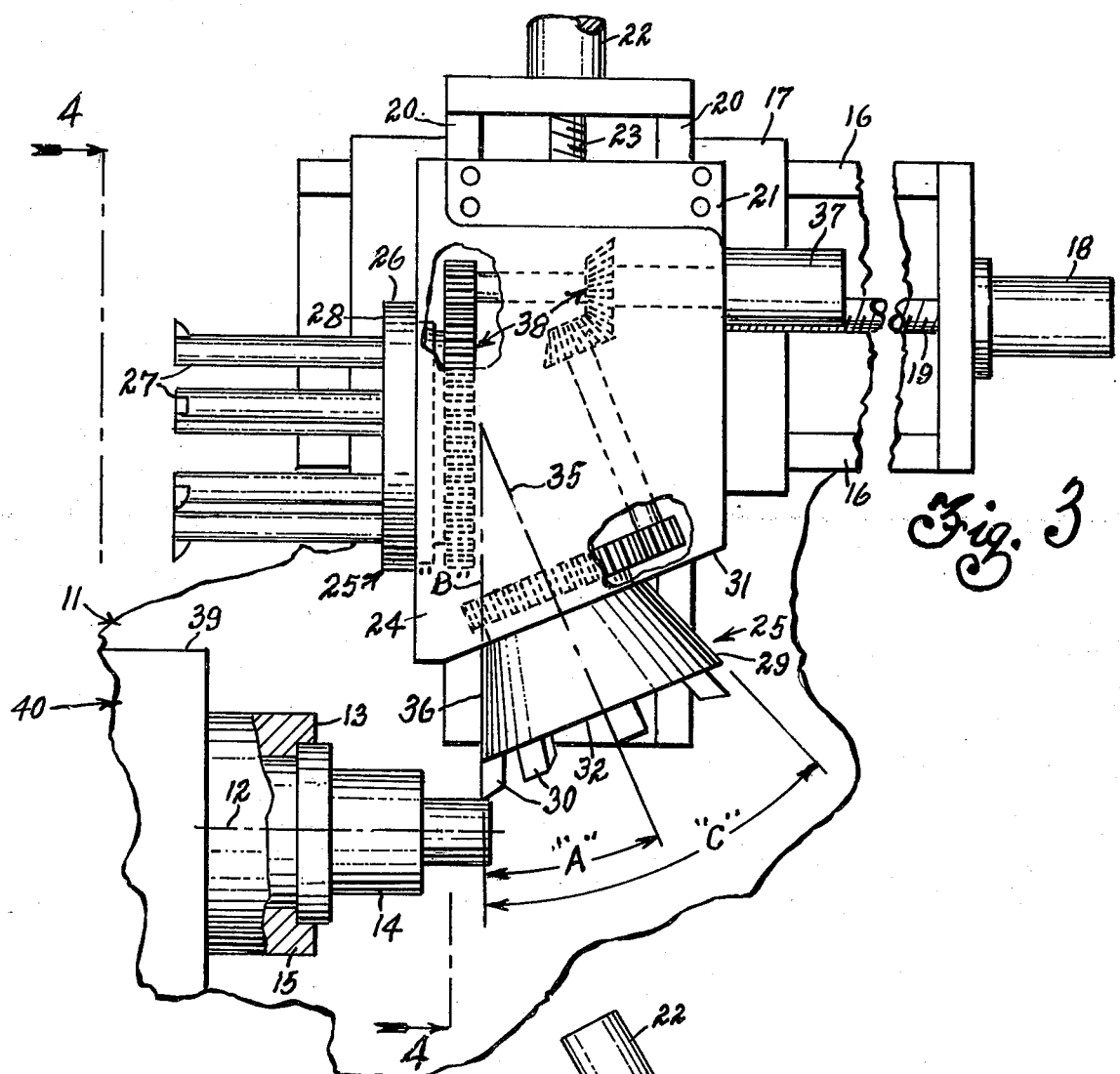
FIG. 3 is a plan view of the upper and lower carriages, work spindle, internal and external turning tool turrets, and common indexing means, taken in the direction of arrow 3, of FIG. 4.

FIGS. 2 and 3 show a machine frame 11, work spindle axis 12, work spindle face 13, and a workpiece 14 shown mounted to the work spindle 15. A way system 16 is shown on the machine frame 11 parallel to the work spindle axis 12. This way system 16 is referred to as the Z-axis, i.e., parallel to the work spindle axes.

A lower carriage 17 is shown mounted on the Z-axis ways 16 and the lower carriage 17 is propelled back and forth on the Z-axis ways 16 by a prime mover 18 and a screw 19. The lower carriage 17, in turn, has a way system 20 mounted to it, which is substantially at a right angle to the work spindle axis 12. An upper carriage 21 is mounted on the ways 20 of the lower carriage 17 and a second prime mover 22 and screw 23 are provided to drive the upper carriage 21 along this vector which is called the X-axis.

This upper carriage 21 carries a tool support 24 within which is rotatably mounted two indexable turrets 25. The first turret 26 nearest the work spindle face 13 contains a plurality of internal turning tools 27 extending outward from the face 28 of said turret 26 on a circular pattern, and further wherein all of the internal turning tools 27 lie with their axes parallel to the work spindle axis 12.

A second, "crown" turret 29 having an equal plurality of external turning tools 30 is shown on the face 31 of the tool support 24 which is farthest from the work spindle face 13. This "crown" turret 29 is shaped as a frustrum of a cone having its base 32 pointing downward away from the tool support 24.

The external turning tools 30 are arrayed along the conical surface 33 with their tool tips 34 extending baseward. The mounting face 31 for this second tool turret 29 is mitered off so that the center line 35 of the turret 29 makes an angle "A" with a line "B," normal to the work spindle axis 12, equal to one-half the included cone angle "C," thus the side 36 of the turret 29 with its respective tool 30 is substantially normal to the work spindle axis 12. Angle "A" may be varied to present desired tool angle reliefs to the workpiece. A common indexing prime mover 37, is drivingly connected through an appropriate gear train 38 to both turrets 25 to provide simultaneous indexing movements thereto.

Figure 4:
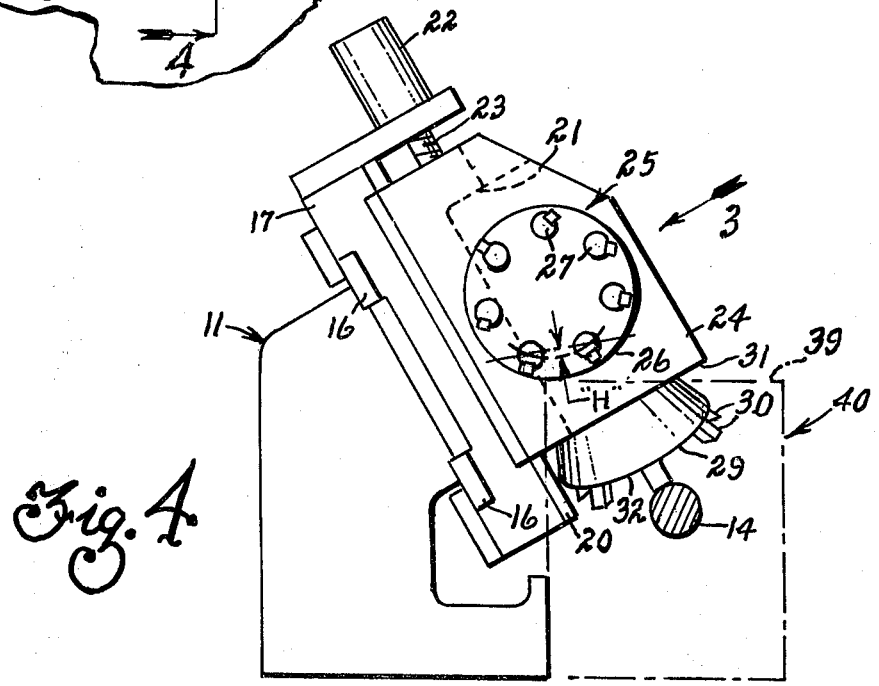
FIG. 4 is an end elevation, taken along the line 4-4 of FIG. 3, showing the machine frame, work spindle axis, upper and lower slides, and internal and external turning tool turrets.

Turing now to FIG. 4, we see an end elevational view showing that the way system 16 for supporting the lower carriage 17 is tilted rearward away from the vertical plane so that both ways 16 support the carriage 17 and the line of vision for the operator is not obstructed.

The internal boring tools 27 are configured on their respective circular tool pattern so that when an external tool 30 is in contact with the workpiece 14 the chordal height "H" of two adjacent internal turning tools 27 on the circular tool pattern, is such that the tools will not touch the topmost surface 39 of the headstock 40. Thus, a minimum size workpiece 14 may be turned by an external turning tool without internal tools 27 touching the top of the headstock 40.

When a tool index is required, the upper carriage 21 with its tool support 24 is retracted slightly upward so both turrets 25 can be indexed simultaneously and there will be no interference with the headstock 40.

FIG. 2 shows the tool configuration of the within invention illustrating the very compact tool arrays requiring only one indexing prime mover 37 and only one set of ways 16, 20 for each of the vectors of motion, "X," and "Z." This improved configuration results in a very high density packing of tools within a minimum envelope of machine frame 11, and further, results in a simplified system of ways and tools and thus, results in a improved efficiency of the machine because of the shorter distances which are needed to be moved to accomplish index of tools.

It is obvious that minor changes may be made in the form and construction of the invention without departing from the material, and spirit thereof. It is not, however, desired to confine the invention to the exact form herein shown and described but it is desired to include all such as properly come within the scope claimed.

Therefore, what is claimed as new and desired to to be secured by Letters Patent is:

1. In a machine tool, the combination comprising:
 a. a frame;
 b. a work spindle rotatably mounted on said frame for carrying a workpiece to be machined;
 c. a slide, including a lower carriage reciprocably mounted on said frame substantially parallel to the axis of said work spindle, and further including an upper carriage reciprocably mounted on said lower carriage substantially radial to the axis of said work spindle; and
 d. a tool support mounted on said upper carriage carrying two rotatably mounted turrets, each of which is provided with a plurality of tool holders, wherein one of said turrets is nearest the work spindle face measured along an axis parallel to the work spindle axis and carries internal turning tools and further wherein the other of said turrets is farthest from the work spindle face and carries external turning tools.

2. The combination of claim 1, wherein the internal turning tool - carrying turret is mounted with its central axis of rotation parallel to the work spindle axis and has internal turning tools projecting parallel to one another and to said central axis from a circular pattern disposed toward the work spindle face.

3. The combination of claim 1, wherein the external turning tool - carrying turret comprises a frustum of a cone, the base of which extends generally toward the work spindle axis, having tools arrayed baseward along the sides of said frustum, and further wherein said frustum is mounted with its central axis of rotation at an angle to a line normal to said work spindle axis substantially equal to one half the cone angle, such that as a frustum side-mounted tool is presented to the work spindle face, all other tools on said frustum will be directed away from the work spindle face.

* * * * *